United States Patent [19]

Van Buul

[11] Patent Number: 4,755,739
[45] Date of Patent: Jul. 5, 1988

[54] SWITCHED DIRECT VOLTAGE CONVERTER

[75] Inventor: Marinus C. W. Van Buul, Breda, Netherlands

[73] Assignee: U.S. Philips Corporation, New York, N.Y.

[21] Appl. No.: 46,973

[22] Filed: May 5, 1987

[30] Foreign Application Priority Data

May 15, 1986 [NL] Netherlands .................. 8601242

[51] Int. Cl.$^4$ .............................................. G05F 1/618
[52] U.S. Cl. .................................. 323/222; 323/224; 323/272; 323/225
[58] Field of Search ............... 323/222, 224, 225, 268, 323/271, 272; 363/16, 59–61

[56] References Cited

U.S. PATENT DOCUMENTS

| 3,559,029 | 1/1971 | Yarema | 363/16 |
|---|---|---|---|
| 4,168,477 | 9/1979 | Burchall | 323/222 |
| 4,242,629 | 12/1980 | Shuey | 323/222 |
| 4,642,550 | 2/1987 | Illuzzi et al. | 323/222 |

FOREIGN PATENT DOCUMENTS

2050359 5/1971 Fed. Rep. of Germany ...... 323/272

*Primary Examiner*—Peter S. Wong
*Attorney, Agent, or Firm*—David R. Treacy; Bernard Franzblau

[57] ABSTRACT

A switched direct voltage converter comprises at least one semiconductor switch (S1) controlled by a control circuit (CC) via a switching input (SI). The semiconductor switch is formed by at least one pair of complementary field effect transistors (T1, T2) connected in a series arrangement (I1) having through-connected voltage-controlled gate electrodes. A converted direct voltage (VS) is obtained by changing over the switch (S1) between first and second supply voltage terminals (VT1, VT2). An input terminal (IT) for connection to a direct voltage supply source (V1) is connected via a coil (L) to a series junction point (SP) between the pair of complementary field effect transistors (T1, T2). A converter output terminal (OT) is connected to one (VT1) of the supply voltage terminals, and a capacitor (C3) is connected between the first and second supply voltage terminals (VT1, VT2) and between the input and output terminals (IT, OT), respectively. As a result, in the pair of complementary field effect transistors (T1, T2') the regular output has become an input (supply voltage connection) and a regular supply voltage terminal has become the output. The field effect transistor property of conducting current in two directions is utilized in the converter. A buffer-integrated circuit may be used with the interchanged connections in the converter.

8 Claims, 2 Drawing Sheets

SWITCHED DIRECT VOLTAGE CONVERTER

BACKGROUND OF THE INVENTION

This invention relates to a switched direct voltage converter comprising a control circuit and at least one semiconductor switch controlled by the control circuit via a switching input. The semiconductor switch is formed with at least one pair of series-connected complementary field effect transistors having through-connected voltage-controlled gate electrodes. The direct voltage converter is provided with an input terminal for connection to a direct voltage supply source and an output terminal for the supply of a converted direct voltage obtained across a capacitor by switching the semiconductor switch between supply voltage terminals via the switching input.

A direct voltage converter of this type is described n U.S. Pat. No. 4,302,804. The input terminal conveying the direct voltage is connected via a series arrangement of diodes to the output terminal which is coupled to ground via the said capacitor. Except for the diode connected to the output terminal, each diode has an electrode coupled to ground via an associated semiconductor switch. A series junction point between the pair of complementary field effect transistors is coupled via an associated capacitor to the other electrode of the diode. The switching inputs of the semiconductor switches are connected in the control circuit to outputs of a counting circuit to which clock pulses are applied. Under the control of the clock pulses the semiconductor switches are alternately switched in a cycle between the input direct voltage and the ground potential so that, dependent on the number of diodes and capacitors, a voltage multiplication is obtained because the capacitor voltages are added together in series and together supply the converted direct voltage across the first-mentioned capacitor.

Dependent on the number of capacitors and diodes in series, output voltages are obtained of the order of 1, 2, 4, 8 times etc. the differential voltage of the input voltage and a diode voltage drop. Intermediate values cannot be generated without taking further measures. The use of a large number of diodes and associated capacitors suitable for conveying the multiplied voltages is noted as a further drawback. There is also a voltage drop across each of the conducting diodes, which drop is substantially independent of the current derived from the output terminal by a load connected thereto. The result is a dissipation which is larger than in the case where the voltage drop is dependent on the current.

SUMMARY OF THE INVENTION

It is an object of the invention to provide a switched direct voltage converter which, as desired, can generate a given converted direct voltage without the use of the said diodes and associated capacitors and in which a reduced dissipation is present. To this end a converter according to the invention is characterized in that the input terminal is connected via a coil to a series junction point between the pair of complementary field effect transistors and in that the output terminal is connected to one of the supply voltage terminals in the series arrangement of the complementary field effect transistors, the said capacitor being present between the supply voltage terminals or between the input and output terminals, respectively.

The said objects are achieved by the described structure in which the input terminal of the converter is connected to the series junction point which is normally used as an output of the semiconductor switch and in which the output terminal of the converter is connected to a regular supply voltage terminal of the semiconductor switch. In the converter the property of field effect transistors is utilised in that they can conduct current in both directions. The voltage drop across the field effect transistors is dependent on the current flowing therethrough so that the dissipation is at a minimum.

An embodiment of a converter in which at least the one semiconductor switch forms part of an integrated circuit formed with several semiconductor switches having the same switching mode and each being formed with at least one pair of series-connected complementary field effect transistors having through-connected voltage-controlled gate electrodes provides the possibility of deriving an increased output current from the converter while the efficiency remains the same, or of improving the efficiency when the outut current remains the same.

To this end an embodiment according to the invention is characterized in that several of the semiconductor switches constitute a parallel arrangement with through-connected switching inputs, through-connected series junction points between the pairs of complementary field effect transistors and through-connected supply voltage terminals, respectively, in the series arrangements of the complementary field effect transistors.

A further embodiment in which the integrated circuit is used is characterized in that the integrated circuit is also formed with at least one further semiconductor switch having an inverse switching mode and including at least one pair of series-connected complementary field effect transistors having through-connected voltage-controlled gate electrodes, the said further semiconductor switch and a semiconductor switch of the said several semiconductor switches forming part of an oscillator circuit which is present in the control circuit.

It is achieved thereby that the described integrated circuit is utilised for the converter in an optimum manner.

A simple stabilised converter embodiment in which the control circuit is formed with a voltage stabilising circuit for the converted direct voltage is characterized in that in the stabilising circuit, which is formed with a differential amplifier, a differential amplifier input is connected to a tapping on a resistive voltage divider which is present between the said supply voltage terminals and in that a further differential amplifier input is connected to a terminal conveying a reference direct voltage, a differential amplifier output being connneted to an oscillator circuit which is present in the control circuit.

If the converter according to the invention is suitable for connection to a stabilised direct voltage supply source, an embodiment is characterized in that the terminal conveying the reference direct voltage is connected to the said input terminal.

BRIEF DESCRIPTION THE DRAWINGS

The invention will now be described in greater detail by way of example with reference to the accompanying drawing, in which:

FIG. 1 shows a circuit diagram of a first embodiment of a switched direct voltage converter according to the invention, and FIG. 2 shows a second embodiment provided with semiconductor switches operating in an inverse switching mode as compared with the circuit of FIG. 1.

DESCRIPTION OF THE PREFERRED EMBODIMENTS

Figure 1:
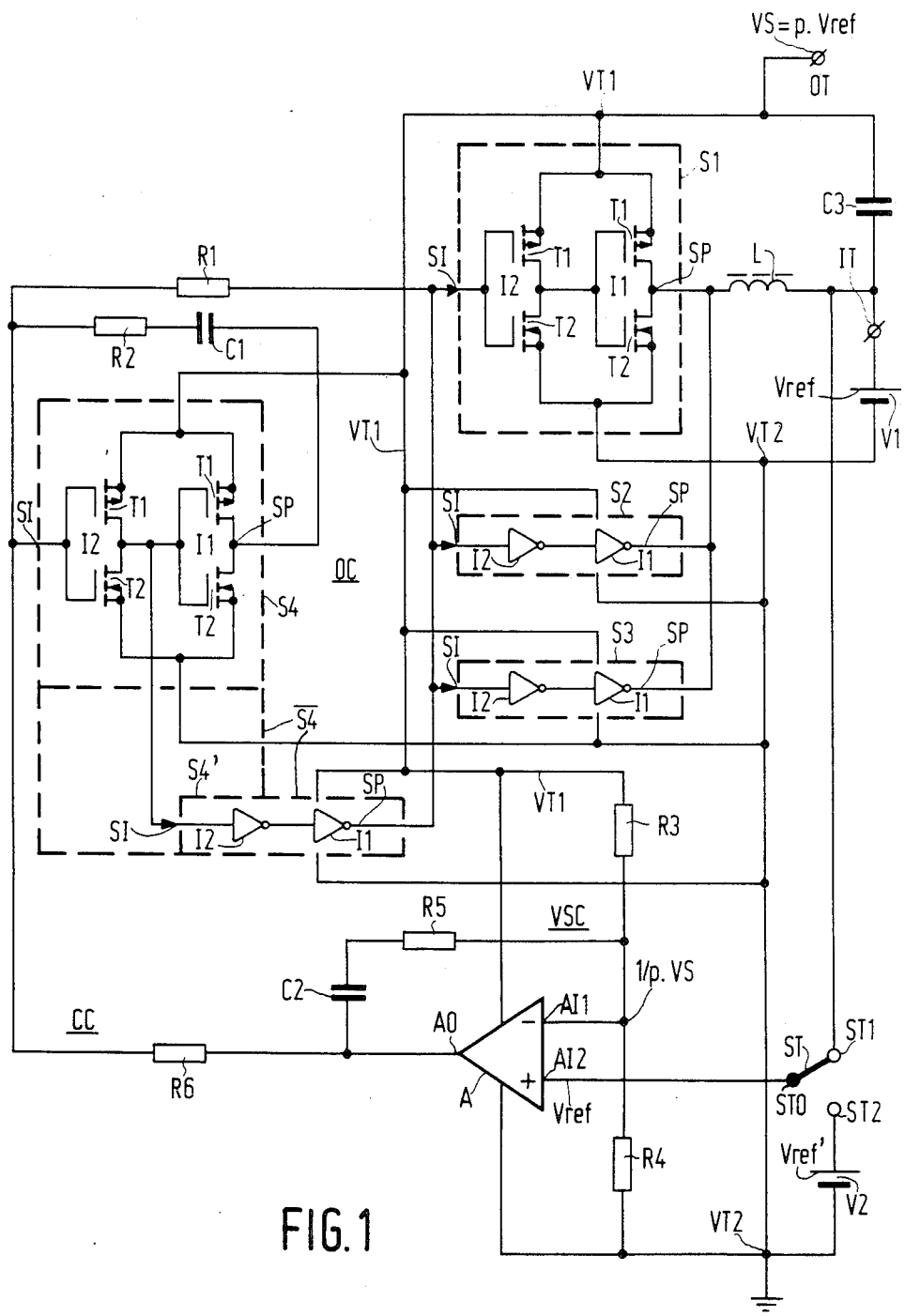

In the circuit diagram of FIG. 1, showing a switched direct voltage converter according to the invention, the references S1, S2 and S3 denote three semiconductor switches connected in a parallel arrangement (S1, S2, S3). The switches S are identically built up with pairs of complementary field effect transistors T1 and T2 connected in series arrangements I1 and I2 having through-connected voltagecontrolled gate electrodes as are shown in detail for the switch S1. The transistors T1 are of the p-channel type and the transistors T2 are of the n-channel type. The source electrodes of the transistors T1 and T2, respectively, are connected together and are connected to first and second supply voltage terminals VT1 and VT2, respectively, having a high and a low supply voltage, respectively. The gate electrodes of the transistors T1 and T2 in the series arrangement I1 are connected to the interconnected drain electrodes of the transistors T1 and T2 in the series arrangement I2 whose gate electrodes are connected to a switching input SI of the switch S1. The interconnected drain electrodes of the transistors T1 and T2 in the series arrangement I1 constitute a series junction point therein which is denoted by SP. FIG. 1 shows that in the parallel arrangement (S1, S3, S3) of the three semiconductor switches the switching inputs SI, the series junction points SP and the supply voltage terminals VT1 and VT2, respectively, are connected together.

The semiconductor switches S are active in known manner such that a high voltage at the input SI yields a low voltage at the gate electrodes of the series arrangement I1 and consequently a high voltage at the series junction point SP. The transistors T2 (I2) and T1 (I1) are then conducting. A low voltage at the input SI with conducting transistors T1 (I2) and T2 (I1) leads to a low voltage at the point SP. It is apparent that the series arrangements I1 and I2 are active as inverter circuits I. The inverter symbol is shown in the switches S2 and S3. In the parallel arrangement (S1, S2, S3) all three semiconductor switches are active as change-over switches so that the point SP is connected to the terminals VT1 and VT2 conveying the high and low supply voltages, respectively, at a high and a low voltage, respectively, occurring at the input SI. A voltage drop occurs across the conducting transistors T, which drop more or less linearly depends on the conveyed current if the currents are not too large. Normally the current through the conducting transistors T1 (I1) and T2 (I1) flows from the supply voltage terminal VT1 to the point SP and from the point SP to the supply voltage terminal VT2, respectively. It will appear that the current through the transistor T1 (I1) in the converter according to the invention flown in the opposite direction.

To obtain the switching voltage at the inputs SI, the converter includes an oscillator circuit OC which forms part of a control circuit CC, as well as a voltage stabilising circuit VSC. The oscillator circuit OC generates a square-wave varying voltage and is formed with two semiconductor switches $\overline{S4}$ and S4' having the same switching mode as the switches S1, S2 and S3 and connected between the supply voltage terminals VT1 and VT2. However, since the through-connected drain electrodes of the transistors T1 and T2 of the series arrangement I2 of the switch S4 are connected to the switching input SI of the switch S4', they are jointly active as a semiconductor switch $\overline{S4}$ which has an inverse swiching mode. At a high and a low voltage at the input SI of the switch S4 the junction point SP of the switch S4' has a low and a high voltage, respectively, because three inverter circuit I2, I2 and I1 are present between them. For obtaining the oscillator action, the junction points SP of the switches $\overline{S4}$ and S4 are connected via a resistor R1 and a series arrangement of a capacitor C1 and a resistor R2, respectively, to the input SI of the switch S4.

To obtain a controlled oscillator circuit OC, the input SI of the oscillator switch S4 receives a control voltage by connection to an output of the voltage stabilising circuit VSC. The control implies that at a given oscillator frequency the duty cycle per oscillator period may change, that is to say, the intermediate edge in the square-wave varying oscillator voltage occuring between a first and a second period of the oscillator period is displaced. The circuit VSC includes a differential amplifier A which is connected between the supply voltage terminals VT1 and VT2, with a (−) input AI1, a (+) input AI2 and an output AO being indicated. The differential amplifier input AI1 is connected to a tapping on a resistive voltage divider (R3, R4) consisting of two resistors R3 and R4 connected between the supply voltage terminals VT1 and VT2. The (−) input AI1 is connected via a resistor R5 and a capacitor C2 in series to the output AO which is connected via a resistor R6 to the input SI of the switch S4. The differential amplifier input AI2 is connected to a terminal STO of a change-over device ST via which the terminal STO can be connected to a change-over terminal ST1 or ST2 so that the input AI2 receives one of two reference direct voltages Vref and Vref'. Thus an integrating differential amplifier (A, R5, C2) is formed for supplying the control voltage to the input SI of the oscillator switch S4 at which the differential voltage between the inputs AI1 and AI2 is at a minimum.

Figure 2:
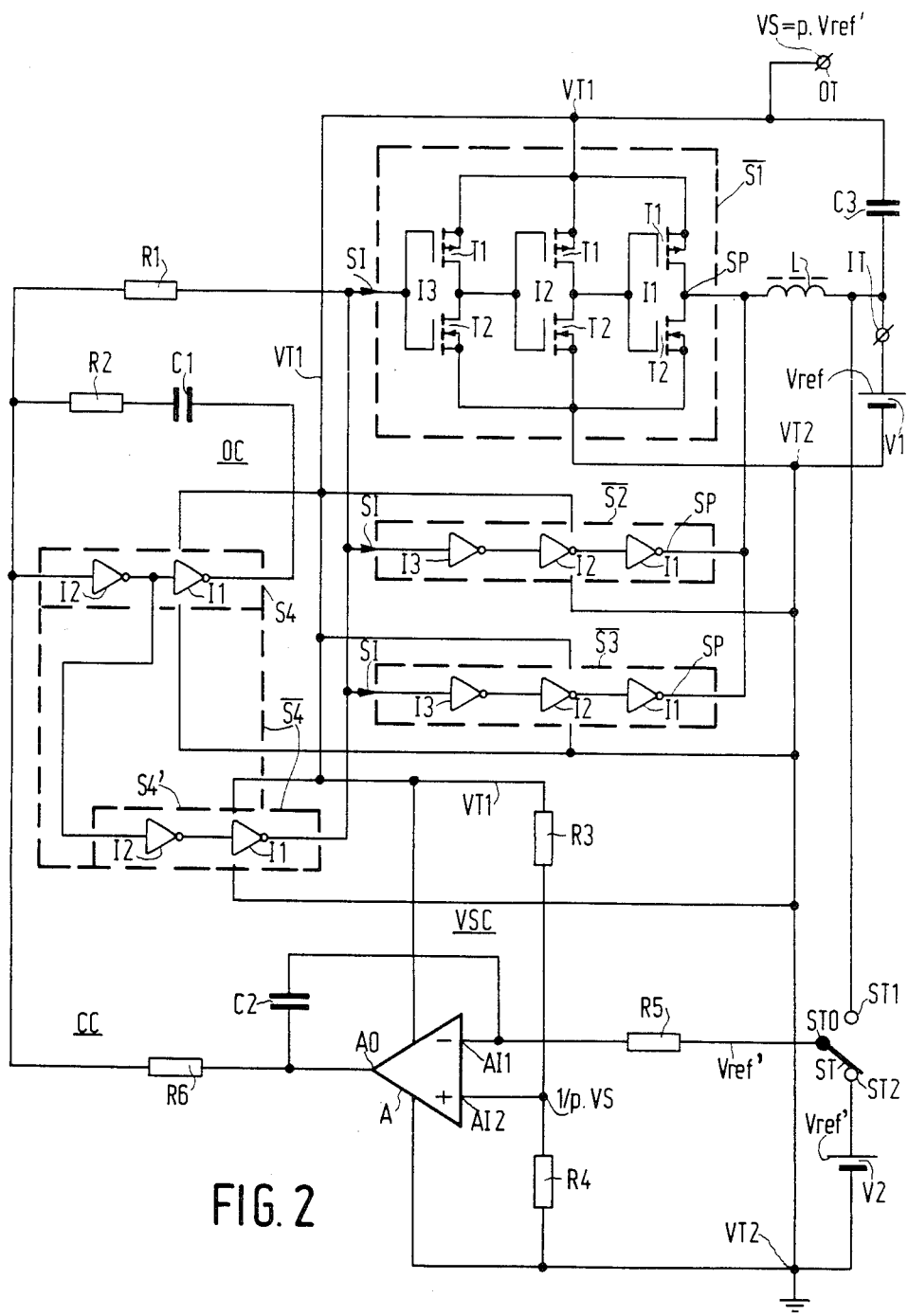

In the previously described structure of the converter the choice of the location and the manner of the direct voltage supply and of the location from which the converted voltage is derived leads to a converter embodiment according to the invention. To this end the series junction point SP of each of the switches S1, S2 and S3 is connected via a coil L wound or not wound on a core to an input terminal IT of the converter for connection to a terminal of a direct voltage supply source V1. The negative terminal of the source V1 is connected to the supply voltage terminal VT2, which is connected to ground. The positive terminal of the source V1, which is denoted by Vref, supplies this voltage as an input direct voltage for the converter. The converter has an output terminal OT for the supply of the converted voltage, which terminal is connected to the supply terminal VT1 and to the input terminal IT via a capacitor C3. In this case the capacitor C3 is present in series with the source V1 between the terminals VT1 and VT2. Instead, the capacitor C3 may be directly connected between the terminals VT1 and VT2. If this connection possibility is chosen there is no voltage addition of capacitor voltage and source voltage. It has been indicated at the output terminal OT that this terminal supplies a converted direct voltage VS=p.Vref. It is assumed that the differential amplifier input AI1 receives a voltage 1/p.Vs via the voltage divider (R3, R4) and that the input AI2 conveys the voltage Vref because the change-over device ST through-connects the terminal ST1, which is connected to the input terminal IT. There applies that: 1/p=R4/(R3+R4). The source V1 is, for example, a stabilised direct voltage supply source. If this is not the case, the output voltage VS will vary with the input voltage Vref. A stabilised output voltage VS may then be obtained by through-connecting the terminal ST2 via the change-over device ST, because this terminal is coupled to ground via a stabilised direct voltage source V2 conveying a reference voltage Vref'. As is shown in FIG. 2 the voltage VS=p.Vref' is then generated.

To explain the operation of the converter according to FIG. 1 in which the regular output in the series arrangement I1 of the pair of complementary field effect transistors T1 and T2 has become an input and in which a regular supply voltage terminal has become an outut, the following applies. It is essential that for the transistors T1 and T2 of the series arrangements I1 of the switches S1, S2 and S3 which can conduct current in both directions, dependent on the values of the voltages occurring at the transistor electrodes, this property is utilised at the transistors T1 (I1). In fact, as compared with the regular use of the semiconductor switches S1, S2 and S3, the current through the transistors T1 (I1) flows in the opposite direction. There is a minimum dissipation because the voltage drop across the conducting field effect transistors T1 and T2 is more or less linearly dependent on the conveyed current. In the first instance it is assumed that no current is derived from the output terminal OT so that there are only losses in the converter itself. The converter generates the output voltage VS=p.Vref=Vref+VC3 in which VC3 is the mean voltage across the capacitor C3. The voltage VC3=(p-1) Vref is obtained in that the transistors T2 (I1) conduct in a circuit (V1, L, T2) during the first period of the oscillator period with a slightly increasing current, and the transistors T1 (I1) conduct during the second period in a circuit (L, T1, C3) with a slightly decreasing current, while for the ratio between the first and second period there applies that it is equal to (p-1):1. The voltage divider (R3, R4) in the voltage stabilising circuit VSC ensures that the intermediate edge between the first and second period of the oscillator period is located correctly. The current through the coil L flows in an evenly distributed manner through the switches S1, S2 and S3. The coil current has a low mean value (for the no-load loss) with respect to which the equally large current increase and current decrease occur. The charge transferred during the second period by the transistors T1 (I1) from the switches S1, S2 and S3 to the capacitor C3 is used to supply the circuits VSC and OC and to compensate for the switching losses at the switches S.

Subsequently it is assumed in the second instance that a load derives current from the output terminal OT. The result is a voltage decrease in the voltage VS because this current is supplied by the capacitor C3. The voltage decrease becomes manifest via the voltage divider (R3,R4) at the differential amplifier A and changes the control voltage so that the first period when the circuit (V1, L, T2) is active becomes longer, and the second period with the circuit (L, T1, C3) being active becomes shorter. The voltage decrease in the voltage VS therefore becomes initially larger. Due to the longer first period, however, the current increase in the coil L becomes larger, which in spite of the shorter period leads to an increased charge transfer in the second period via the transistors T1 (I1) to the capacitor C3. The increase of the charge transfer during the second periods continues until the charge transfer has become as large as the sum of the charge supplied to the load and the no-load loss, and thus at the output the voltage VS has increased again to the value p.Vref. In this condition the ratio between the first and second periods has become approximately equal again to (p-1):1, while the mean current through the coil L has become larger to such an extent that the supplied charge, the conduction losses in the transistors T1 and T2 and the no-load loss are completely compensated for. A new state of balance is then reached which is associated with the power supplied to the load. A decrease thereof initially leads to an increased voltage VS, whereafter there is a feedback and another state of balance with a reduced mean current present in the coil current.

If the capacitor C3 is directly connected between the terminals VT1 and VT2, the foregoing description principally remains true, with the difference that the ratio between the first and the second period is equal to p:1.

In the converter according to FIG. 1, known integrated circuits formed with the described semiconductor switches with pairs of complementary field effect transistors can be used to an optimum extent. An example is an integrated circuit of the Philips trade mark which is indicated by HEF 4041 and which is a quadruple true/complement buffer. The switches S1, S2, S3 and S̄4 shown in FIG. 1 correspond to the four true buffers and the switch S4 corresponds to one of the four complement buffers. In contrast to the information given in data handbooks, the regular outputs of some buffers are connected to the input supply voltage and the regular supply voltage connections in some buffers are connected to the converter output terminal. Of the four true buffers there are thus three buffers active as parallel switches S1, S2 and S3 so that for the same efficiency an increased output current is obtained, or the efficiency is improved for the same output current. Since the voltage drop across the conducting field effect transistors T1 and T2 is dependent on the conveyed current, there is a minimum dissipation.

When using the HEF 4041 buffer the supply voltage according to the data handbook may be 15 V at a maximum and a current of up to approximately 30 mA can be passed through the buffers. These values fix the limits for the maximum output voltage VS and the output current for each switch S1, S2 and S3 of the converter. When using the HEF 4041 buffer-integrated circuit and a differential amplifier indicated by LM358 of the Signetics trade mark, a converter embodiment can be realised with the following data :

Vref= +5 V, VS= +10 V, L=2,2 mH, C3=1 μf
R1=22k, R2=3.3k, C1=100 pF, R3=R4=R5=R6=47k and
C2=100 nF, in which the values of the resistors R are given in ohms.

The circuit diagram of FIG. 2 is shown for the case where the HEF 4041 buffer integrated circuit is used with the complement buffers for switches S̄1, S̄2 and S̄3. Each complement buffer is formed with three inverter circuits I1, I2 and I3. Instead, one inverter circuit I1 for each switch may be considered. Components and terminals indicated in FIG. 1 are partly indicated in the same manner in FIG. 2. The structure of the voltage stabilising circuit VSC is adapted to the use of the complement buffers. The (+) input AI2 of the differential amplifier A is connected to the tapping on the resistive voltage divider (R3, R4). The (−) input AI1 is connected to the output AO via the capacitor C2 only and is connected to the terminal STO of the change-over device ST via the resistor R5. As an example, the terminal ST2 conveying the reference voltage Vref' is through-connected to the terminal ST.

For the description of the operation of the converter of FIG. 2 reference is made to the description of FIG. 1. There is the difference that a high voltage at the switching inputs SI of the switches $\overline{S1}$, $\overline{S2}$ and $\overline{S3}$ is accompanied by a low voltage at the series junction points SP of the series arrangements I1. The data associated with the converter embodiment of FIG. 1 apply in an unmodified form to the embodiment of FIG. 2.

What is claimed is:

1. A switched direct voltage converter comprising a control circuit and at least one semiconductor switch having a switching input and controlled by the control circuit via its switching input, the semiconductor switch including at least one pair of series-connected complementary field effect transistors having through-connected voltage-controlled gate electrodes, said direct voltage converter having an input terminal for connection to a direct voltage supply source and an output terminal for the supply of a converted direct voltage obtained across a capacitor by switching the semiconductor switch between first and second supply voltage terminals via its switching input, wherein the input terminal is connected via a coil to a series junction point between the pair of complementary field effect transistors and the output terminal is connected to one of the supply voltage terminals in the series arrangement of the complementary field effect transistors, the said capacitor being connected between the supply voltage terminals or between the input and output terminals.

2. A switched direct voltage converter as claimed in claim 1 wherein at least the one semiconductor switch forms part of an integrated circuit including several semiconductor switches having the same switching mode and each including at least one pair of series connected complementary field effect transistors having through-connected voltage-controlled gate electrodes, characterized in that at least some of the semiconductor switches constitute a parallel arrangement with through-connected switching inputs, through-connected junction points between the pairs of complementary field effect transistors and through-connected supply voltage terminals respectively in the series arrangements of the complementary field effect transistors.

3. A switched direct voltage converter as claimed in claim 1 wherein at least the one semiconductor switch forms part of an integrated circuit including several semiconductor switches having the same switching mode and each including at least one pair of series-connected complementary field effect transistors having through-connected voltage-controlled gate electrodes, characterized in that the integrated circuit comprises at least one further semiconductor switch having an inverse switching mode and including at least one pair of series-connected complementary field effect transistors having through-connected voltage-controlled gate electrodes, said further semiconductor switch and a semiconductor switch of said several semiconductor switches forming part of an oscillator circuit present in the control circuit.

4. A switched direct voltage converter as claimed in claim 1 wherein the control circuit includes a voltage stabilising circuit for the converted direct voltage, characterized in that the stabilising circuit includes a differential amplifier with an input connected to a tapping on a resistive voltage divider present between said supply voltage terminals and in that a further differential amplifier input is connected to a terminal conveying a reference direct voltage, a differential amplifier output being connected to an oscillator circuit present in the control circuit.

5. A switched direct voltage converter as claimed in claim 4, characterized in that the terminal conveying the reference direct voltage is connected to said converter input terminal.

6. A switched direct voltage converter as claimed in claim 2 wherein at least the one semiconductor switch forms part of an integrated circuit including several semiconductor switches having the same switching mode and each including at least one pair of series-connected complementary field effect transistors having through-connected voltage-controlled gate electrodes, characterized in that the integrated circuit comprises at least one further semiconductor switch having an inverse switching mode and including at least one pair of series-connected complementary field effect transistors having through-connected voltage-controlled gate electrodes, said further semiconductor switch and a semiconductor switch of said several semiconductor switches forming part of an oscillator circuit included in the control circuit.

7. A switched direct voltage converter as claimed in claim 1 wherein the control circuit comprises, an oscillator circuit having an output coupled to said switching input, and a voltage stabilizing circuit comprising a differential amplifier having a first input connected to a tap on a voltage divider connected between the supply voltage terminals and a second input selectively coupled via a switch to respective terminals of first and second sources of reference voltage, and means coupling an output of the differential amplifier to said oscillator circuit.

8. A switched direct voltage converter as claimed in claim 7 wherein the differential amplifier includes an RC circuit coupled thereto so as to form an integrating differential amplifier.

* * * * *